(12) United States Patent
Lee et al.

(10) Patent No.: US 12,366,672 B2
(45) Date of Patent: Jul. 22, 2025

(54) OPTICAL SYSTEM AND CORRESPONDING OPTICAL METHOD

(71) Applicant: IMEC vzw, Leuven (BE)

(72) Inventors: Jiwon Lee, Herent (BE); Xavier Rottenberg, Kessel-Lo (BE); Murali Jayapala, Kessel-Lo (BE)

(73) Assignee: IMEC vzw, Leuven (BE)

( * ) Notice: Subject to any disclaimer, the term of this patent is extended or adjusted under 35 U.S.C. 154(b) by 178 days.

(21) Appl. No.: 17/661,251

(22) Filed: Apr. 28, 2022

(65) Prior Publication Data

US 2022/0350040 A1    Nov. 3, 2022

(30) Foreign Application Priority Data

Apr. 30, 2021  (EP) .................................. 21171427

(51) Int. Cl.
*G01T 1/24*  (2006.01)
*G02B 6/42*  (2006.01)

(52) U.S. Cl.
CPC ................. *G01T 1/24* (2013.01); *G02B 6/42* (2013.01); *G02B 6/4206* (2013.01); *G02B 6/4298* (2013.01)

(58) Field of Classification Search
None
See application file for complete search history.

(56) References Cited

U.S. PATENT DOCUMENTS

| | | |
|---|---|---|
| 10,437,064 B2 | 10/2019 | Popovich et al. |
| 2019/0166359 A1 | 5/2019 | Lapstun |
| 2020/0049996 A1* | 2/2020 | Yan .................... G02B 27/0172 |
| 2020/0088639 A1 | 3/2020 | Rothberg et al. |
| 2020/0225471 A1 | 7/2020 | Waldern et al. |
| 2020/0249491 A1 | 8/2020 | Popovich et al. |
| 2020/0265650 A1 | 8/2020 | Schowengerdt |

FOREIGN PATENT DOCUMENTS

| | | |
|---|---|---|
| CN | 106909047 A | 6/2017 |
| CN | 106526730 B | 7/2019 |

(Continued)

OTHER PUBLICATIONS

Ismail et al. "Integrated Approach to Laser Delivery and Confocal Signal Detection", Optics Letters, vol. 35, No. 16, Aug. 15, 2010, pp. 2741-2743.

(Continued)

*Primary Examiner* — Edwin C Gunberg
(74) *Attorney, Agent, or Firm* — Knobbe, Martens, Olson & Bear LLP

(57) ABSTRACT

In one aspect, an optical system is disclosed. In some embodiments, the optical system includes an optical waveguide, and at least two coupling means forming at least one confocal point being located within the optical waveguide, where a first coupling means of the at least two coupling means has a first focal length, and a second coupling means of the at least two coupling means has a second focal length. In some examples, the first coupling means is configured to couple and/or focus incident light to the optical waveguide, and the second coupling means is configured to emit and/or collimate light conveyed by the optical waveguide.

21 Claims, 10 Drawing Sheets

(56) References Cited

FOREIGN PATENT DOCUMENTS

EP          0 360 209 A2     3/1990
WO     WO-2020157310 A1 *   8/2020   ......... G02B 27/0101

OTHER PUBLICATIONS

Waldern et al., "DigiLens Switchable Bragg Grating Waveguide Optics for Augmented Reality Applications", Proc. SPIE, vol. 10676, Digital Optics for Immersive Displays, 106760G, May 21, 2018.
Extended Search Report in EP Application No. 21171427.4, dated Oct. 22, 2021.
Rottenberg et al. "Wafer-scale 2.5D Optics in the Visible and Near Infrared for Advanced Light Management", Proceedings vol. 11765, Optical Architectures for Displays and Sensing in Augmented, Virtual, and Mixed Reality (AR, VR, MR) II; Spie AR VR MR Event, Mar. 27, 2021.
Rottenberg et al. "Wafer-scale 2.5D Optics in the Visible and Near Infrared for Advanced Light Management", Abstract from Paper 11616-16.

* cited by examiner

OPTICAL SYSTEM AND CORRESPONDING OPTICAL METHOD

CROSS-REFERENCE TO RELATED APPLICATIONS

This application claims foreign priority to European Patent Application No. 21171427.4, filed Apr. 30, 2021, the content of which is incorporated by reference herein in its entirety.

BACKGROUND

Technological Field

The disclosed technology relates to an optical system, and more particularly, to an integrated optical system, and a corresponding optical method.

Description of the Related Technology

In times of an increasing number of applications including optical components such as image sensor, there is a growing need of an optical system and an optical method that can allow for an efficient magnification or demagnification and can boost incoming light. Further, since signal-to-noise ratio may drop as the pixel size scales, there is a growing need for image sensors to increase image quality, such as by boosting incoming light and increasing signal-to-noise ratio.

SUMMARY OF CERTAIN INVENTIVE ASPECTS

U.S. Publication No. 2020/0249491 relates to a transparent wearable data display having a source of collimated light, a deflector for deflecting the collimated light into a scanned beam, and a first of switchable grating elements sandwiched between first and second parallel transparent substrates, which together function as a first light guide. A first coupling is provided for directing the scanned beam into a first total internal reflection (TIR) light path of the first light guide along the first array column. The grating elements have diffracting and non-diffracting states, in their diffracting state deflecting light out of the light guide. The grating elements are switchable into their diffracting states one group of elements at a time. Disadvantageously, in accordance with the corresponding configuration and especially due to the lack of a confocal point, the transparent wearable data display does not allow for an efficient magnification or demagnification, respectively.

Accordingly, one objective of the disclosed technology is to provide an optical system and an optical method that ensure a magnification or a demagnification in a significantly efficient manner.

This objective can be achieved by the features of an optical system and an optical method described herein.

According to a first aspect of the disclosed technology, an optical system is provided. The system includes an optical waveguide, and at least two coupling means forming at least one confocal point being located within the optical waveguide. In this context, a first coupling means of the at least two coupling means has a first focal length. In addition to this, a second coupling means of the at least two coupling means has a second focal length. Furthermore, the first coupling means is configured to couple and/or focus incident light to the optical waveguide, whereas the second coupling means is configured to emit and/or collimate light conveyed by the optical waveguide. Advantageously, magnification or demagnification can be achieved in a particularly efficient manner. Further advantageously, with respect to the optical waveguide, a folded waveguide may be used especially in order to limit aberration.

According to a first implementation form of the first aspect of the disclosed technology, the first coupling means and the second coupling means are confocal. Additionally or alternatively, the second focal length is smaller than the first focal length. In addition to this or as a further alternative, the optical system further includes an optical sensor being configured to receive the light emitted and/or collimated by the second coupling means. Advantageously, light intensity at the pixel level can be increased. Further advantageously, the size of the optical sensor can be very small. As a further advantage, the size of the optical sensor is decoupled from the dimensions of the coupling means.

According to a second implementation form of the first aspect of the disclosed technology, the optical sensor includes or is a camera or an image sensor, for example a complementary metal-oxide-semiconductor image sensor. Advantageously, more light can be brought to the camera or the image sensor, which leads to an increased light intensity at the pixel level.

According to a further implementation form of the first aspect of the disclosed technology, the first coupling means includes at least one of a lens, for example a Fresnel lens, a grating structure, for example a focusing grating coupler, a diffractive element, for example a complex diffractive component, or any combination thereof. Additionally or alternatively, the second coupling means includes at least one of a lens, for example a Fresnel lens, a grating structure, for example a focusing grating coupler, a diffractive element, for example a complex diffractive component, or any combination thereof. In addition to this or as an alternative, if present, at least one further coupling means of the at least two coupling means includes at least one of a lens, for example a Fresnel lens, a grating structure, for example a focusing grating coupler, a diffractive element, for example a complex diffractive component, or any combination thereof. Further additionally or further alternatively, the optical waveguide includes or is a slab-waveguide. Advantageously, at least one, or in some embodiments each, of the above-mentioned coupling means may additionally or alternatively include or be a fiber Bragg grating (FBG).

According to a further implementation form of the first aspect of the disclosed technology, at least one, or in some embodiments each, of the optical waveguide, the first coupling means, and the second coupling means includes at least one of liquid crystal, an electro-optic material, for example barium titanate, geometrical variations, for example formed by way of a micro-electro-mechanical system, or any combination thereof. Additionally, if present, at least one further coupling means of the at least two coupling means includes at least one of liquid crystal, an electro-optic material, for example barium titanate, geometrical variations, for example formed by way of a micro-electro-mechanical system, or any combination thereof. Advantageously, for instance, this allows for tunability or makes the respective portions of the optical system modulatable, respectively.

According to a further implementation form of the first aspect of the disclosed technology, at least one, or in some embodiments each, of the optical waveguide, the first coupling means, and the second coupling means is configured to be thermally and/or electrically tunable. In addition to this or as an alternative, if present, at least one further coupling means of the at least two coupling means is configured to be thermally and/or electrically tunable. Advantageously, each of the above-mentioned liquid crystal, the electro-optic material, for example barium titanate, the geometrical variations, for example formed by way of the micro-electro-mechanical system, may allow for this tunability. Further advantageously, especially in the case of the above-mentioned fiber Bragg grating (FBG), it noted that tuning may be understood as modulating the corresponding positions of the reflective portions of the FBG.

As further advantages, especially in the case that at least the optical waveguide is tunable, an optical zoom can be implemented in a single-camera system, for example a single-camera system for mobile phones, no moving element is necessary for zooming, and a very compact form factor is ensured.

Further advantageously, especially in the case that at least one, for example the first and the second, coupling means is tunable, autofocusing and/or image stabilization can be achieved in a highly efficient manner exemplarily without any moving element.

According to a further implementation form of the first aspect of the disclosed technology, the optical system further includes adjusting means. In this context, the adjusting means is configured to adjust or tune at least one optical parameter of the optical waveguide and/or the first coupling means and/or the second coupling means and/or, if present, at least one further coupling means of the at least two coupling means, for example to adjust or tune at least one optical parameter of the optical waveguide especially at least in the region between the first coupling means and the second coupling means. Advantageously, for instance, tuning or modulating, respectively, can be performed in a particularly accurate and efficient manner.

According to a further implementation form of the first aspect of the disclosed technology, the at least one optical parameter includes or is a refractive index. Advantageously, for example, complexity can be reduced, which leads to an increased efficiency.

According to a further implementation form of the first aspect of the disclosed technology, with respect to the optical waveguide, the adjusting means is configured to tune an optical path distance between the first coupling means and the second coupling means especially in order to tune an effective magnification factor of the optical system. Advantageously, for instance, inefficiencies can be decreased by further reducing complexity.

According to a further implementation form of the first aspect of the disclosed technology, with respect to the optical waveguide, the adjusting means is configured to bias an optical path between the first coupling means and the second coupling means in a biasing direction. Advantageously, for example, efficiency can further be increased.

According to a further implementation form of the first aspect of the disclosed technology, the optical path and the biasing direction enclose an angle between 75 and 105 degrees, or between 80 and 100 degrees, or between 85 and 95 degrees, or in one example 90 degrees. Advantageously, for instance, not only accuracy but also efficiency can further be increased.

According to a further implementation form of the first aspect of the disclosed technology, for biasing the optical path between the first coupling means and the second coupling means, the adjusting means is configured to generate an electrical field substantially parallel to the biasing direction. Advantageously, for example, inefficiencies can further be reduced.

According to a further implementation form of the first aspect of the disclosed technology, the adjusting means includes or is a modulator and/or a capacitance. Advantageously, for instance, complexity, and thus costs, can further be reduced, which leads to an increased efficiency.

According to a further implementation form of the first aspect of the disclosed technology, the optical system is used in the context of at least one of an imager application, a display application, an X-ray application, a beyond magnification application, an endoscopy application, for example a medical endoscopy application, or any combination thereof. Advantageously, for example, a high flexibility can be ensured.

Before the second aspect of the disclosed technology and its implementation forms are described in the following, it is noted that all the advantages mentioned above analogously apply for the example optical method explained below.

According to a second aspect of the disclosed technology, an optical method is provided. The method includes the steps of providing an optical waveguide and at least two coupling means, forming at least one confocal point being located within the optical waveguide with the aid of the at least two coupling means, coupling and/or focusing incident light to the optical waveguide with the aid of a first coupling means, having a first focal length, of the at least two coupling means, and emitting and/or collimating light conveyed by the optical waveguide with the aid of a second coupling means, having a second focal length, of the at least two coupling means.

According to a first implementation form of the second aspect of the disclosed technology, the first coupling means and the second coupling means are confocal. Additionally or alternatively, the second focal length is smaller than the first focal length. In further addition to this or as a further alternative, the optical method further includes the step of receiving the light emitted and/or collimated by the second coupling means with the aid of an optical sensor.

According to a second implementation form of the second aspect of the disclosed technology, the optical sensor includes or is a camera or an image sensor, for example a complementary metal-oxide-semiconductor image sensor.

According to a further implementation form of the second aspect of the disclosed technology, the first coupling means includes at least one of a lens, for example a Fresnel lens, a grating structure, for example a focusing grating coupler, a diffractive element, for example a complex diffractive component, or any combination thereof. Additionally or alternatively, the second coupling means includes at least one of a lens, for example a Fresnel lens, a grating structure, for example a focusing grating coupler, a diffractive element, for example a complex diffractive component, or any combination thereof. In addition to this or as an alternative, if present, at least one further coupling means of the at least two coupling means includes at least one of a lens, for example a Fresnel lens, a grating structure, for example a focusing grating coupler, a diffractive element, for example a complex diffractive component, or any combination thereof. Further additionally or further alternatively, the optical waveguide includes or is a slab-waveguide.

According to a further implementation form of the second aspect of the disclosed technology, at least one, or in some embodiments each, of the optical waveguide, the first coupling means, and the second coupling means includes at least one of liquid crystal, an electro-optic material, for example barium titanate, geometrical variations, for example formed by way of a micro-electro-mechanical system, or any combination thereof. Additionally, if present, at least one further coupling means of the at least two coupling means includes at least one of liquid crystal, an electro-optic material, for example barium titanate, geometrical variations, for example formed by way of a micro-electro-mechanical system, or any combination thereof.

According to a further implementation form of the second aspect of the disclosed technology, the method includes the step of configuring at least one, or in some embodiments each, of the optical waveguide, the first coupling means, and the second coupling means to be thermally and/or electrically tunable. In addition to this or as an alternative, the optical method includes the step of configuring, if present, at least one further coupling means of the at least two coupling means to be thermally and/or electrically tunable.

According to a further implementation form of the second aspect of the disclosed technology, the optical method further includes the step of, with the aid of adjusting means, adjusting or tuning at least one optical parameter of the optical waveguide and/or the first coupling means and/or the second coupling means and/or, if present, at least one further coupling means of the at least two coupling means, for example adjusting or tuning at least one optical parameter of the optical waveguide especially at least in the region between the first coupling means and the second coupling means.

According to a further implementation form of the second aspect of the disclosed technology, the at least one optical parameter includes or is a refractive index.

According to a further implementation form of the second aspect of the disclosed technology, with respect to the optical waveguide, with the aid of the adjusting means, the method includes the step of tuning an optical path distance between the first coupling means and the second coupling means especially in order to tune a respective effective magnification factor.

According to a further implementation form of the second aspect of the disclosed technology, with respect to the optical waveguide, with the aid of the adjusting means, the optical method further includes the step of biasing an optical path between the first coupling means and the second coupling means in a biasing direction.

According to a further implementation form of the second aspect of the disclosed technology, the optical path and the biasing direction enclose an angle between 75 and 105 degrees, or between 80 and 100 degrees, or between 85 and 95 degrees, or in one example 90 degrees.

According to a further implementation form of the second aspect of the disclosed technology, for biasing the optical path between the first coupling means and the second coupling means, with the aid of the adjusting means, the method includes the step of generating an electrical field substantially parallel to the biasing direction.

According to a further implementation form of the second aspect of the disclosed technology, the adjusting means includes or is a modulator and/or a capacitance.

According to a further implementation form of the second aspect of the disclosed technology, the optical method is used in the context of at least one of an imager application, a display application, an X-ray application, a beyond magnification application, an endoscopy application, for example a medical endoscopy application, or any combination thereof.

BRIEF DESCRIPTION OF THE DRAWINGS

Exemplary embodiments of the disclosed technology are now further explained with respect to the drawings by way of example only, and not for limitation. In the drawings.

DETAILED DESCRIPTION OF CERTAIN ILLUSTRATIVE EMBODIMENTS

Firstly, before exemplary embodiments of the disclosed technology will be discussed in greater detail, some general and introductive aspects, especially in the form of advantages, are explained in the following.

For instance, to overcome limitations with scaled pixel size, the disclosed technology can be used for separating focal plane to pixel array. In this context, focal plane especially means where incoming light is focused exemplarily using a lens, and pixel array especially means where incoming light is converted to electron.

Then, the light signals illuminated on focal plane are delivered to the pixel array (for example, image sensor) using wave guide. During this delivery, the size of the image can be scaled. For example, in case of scaling down, disadvantages of the small size pixel can be overcome. Also, by changing the degree of the scaling, zooming operation can also be included.

In some embodiments, separating the focal plane from the imaging plane in the sense of the disclosed technology enables several advantages such as sensitivity boosting, zoom operation especially in horizontal domain (low lens module thickness), color (light wavelength) separation, and enhancing signal-to-noise ratio and/or resolution. In addition to this, especially by changing properties of the materials in between focal plane and imaging plane, optical zoom is possible. For instance, in this way, compactness of a corresponding camera hardware can be achieved.

Figure 1:
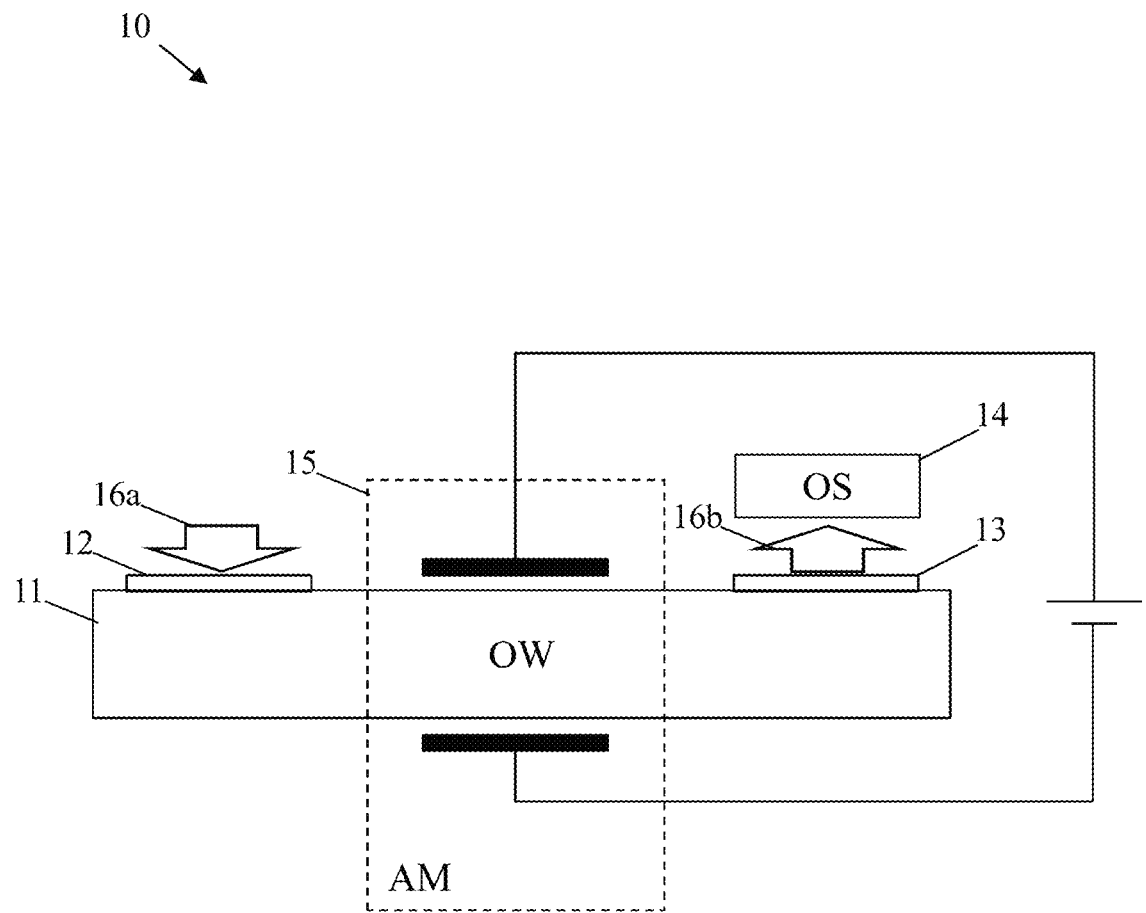
FIG. 1 shows an exemplary embodiment of an optical system according to the disclosed technology.

Now, with respect to FIG. 1, a block diagram of an exemplary embodiment of an optical system 10 according to the disclosed technology is shown. According to FIG. 1, the optical system 10 includes an optical waveguide 11, first coupling means 12 having a first focal length ($f_1$) and being optically connected to a first terminal of the optical waveguide 11, and second coupling means 13 having a second focal length ($f_2$) and being optically connected to a second terminal of the optical waveguide 11.

In this context, the first coupling means 12 is configured to couple and/or focus incident light 16a to the optical waveguide 11. In addition to this, the second coupling means 13 is configured to emit and/or collimate light 16b conveyed by the optical waveguide 11.

It is noted that with respect to the above-mentioned incident light 16a and the above-mentioned conveyed light 16b, these kinds of light are analogously marked with the aid of the same reference signs in the context of FIGS. 2A, 2B, 4, 5, and 6.

It is further noted that the first coupling means 12 and the second coupling means 13 are confocal, wherein the second focal length ($f_2$) is smaller than the first focal length ($f_1$). In this context, it should be mentioned that the respective focal point is located within the optical waveguide 11. Such an optical system 10 can also be called confocal system.

As it can further be seen from FIG. 1, the optical system 10 or confocal system, respectively, additionally includes an optical sensor 14, wherein the optical sensor 14 is configured to receive the light 16b emitted and/or collimated by the second coupling means 13.

In this context, it is noted that it might be particularly advantageous if the optical sensor 14 includes or is a camera or an image sensor, for example a complementary metal-oxide-semiconductor (CMOS) image sensor. Such a CMOS image sensor may be called CIS in the following.

With respect to the first coupling means 12, it is noted that the first coupling means 12 may include at least one of a lens, for example a Fresnel lens, a grating structure, for example a focusing grating coupler, a diffractive element, for example a complex diffractive component, or any combination thereof.

Additionally or alternatively, the second coupling means 13 may include at least one of a lens, for example a Fresnel lens, a grating structure, for example a focusing grating coupler, a diffractive element, for example a complex diffractive component, or any combination thereof. With respect to the optical waveguide 11, it is noted that it might be particularly advantageous if the optical waveguide 11 includes or is a slab-waveguide.

Furthermore, it might be also particularly advantageous if at least one, or in some embodiments each, of the optical waveguide 11, the first coupling means 12, and the second coupling means 13 includes at least one of liquid crystal, an electro-optic material, for example barium titanate, geometrical variations, for example formed by way of a micro-electro-mechanical system, or any combination thereof.

Moreover, at least one, or in some embodiments each, of the optical waveguide 11, the first coupling means 12, and the second coupling means 13 may especially be configured to be thermally and/or electrically tunable. In this context, it is noted that each of the above-mentioned liquid crystal, the electro-optic material, for example barium titanate, the geometrical variations, for example formed by way of the micro-electro-mechanical system, may exemplarily allow for the tunability.

In further accordance with FIG. 1, the confocal system 10 additionally includes adjusting means 15, wherein the adjusting means 15 may be configured to adjust or tune at least one optical parameter of the optical waveguide 11 and/or the first coupling means 12 and/or the second coupling means 13, for example of the optical waveguide 11 especially at least in the region between the first coupling means 12 and the second coupling means 13.

In this exemplary embodiment, this alternative is implemented. Accordingly, the adjusting means 15 adjusts or tunes the at least one optical parameter of the optical waveguide 11. With respect to the at least one optical parameter, it is noted that it might be particularly advantageous if the at least one optical parameter includes or is a refractive index.

In addition to this or as an alternative, with respect to the optical waveguide 11, the adjusting means 15 may be configured to tune an optical path distance between the first coupling means 12 and the second coupling means 13 especially in order to tune an effective magnification factor of the optical system 10.

Further additionally or further alternatively, also with respect to the optical waveguide 11, the adjusting means 15 may be configured to bias an optical path between the first coupling means 12 and the second coupling means 13 in a biasing direction. In this context, it might be particularly advantageous if the optical path and the biasing direction enclose an angle between 75 and 105 degrees, or between 80 and 100 degrees, or between 85 and 95 degrees, or in one example 90 degrees.

Furthermore, for biasing the optical path between the first coupling means 12 and the second coupling means 13, the adjusting means 15 is configured to generate an electrical field substantially parallel to the biasing direction. Exemplarily, as it can be seen from FIG. 1, the adjusting means 15 especially is a capacitance or a capacitor, respectively, which generates the electrical field. As an alternative, it is noted that the adjusting means 15 may include or be a modulator and/or a capacitance.

Figure 8:
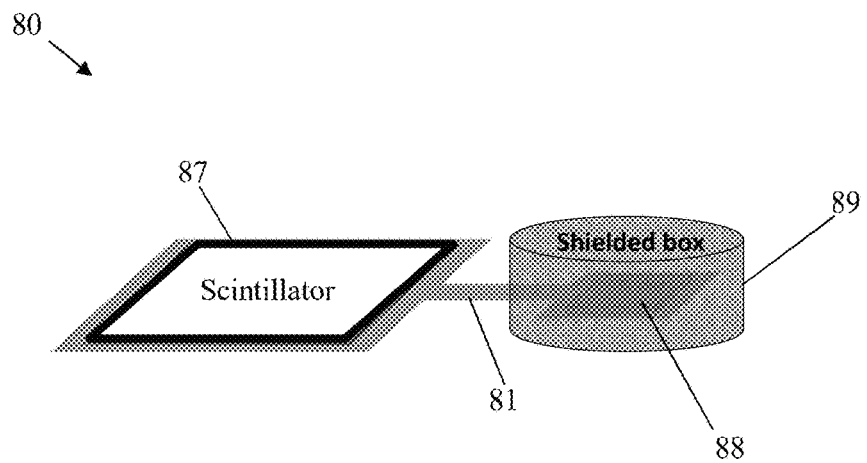
FIG. 8 shows an exemplary usage of the disclosed technology in the context of an X-ray image sensor.
Figure 9:
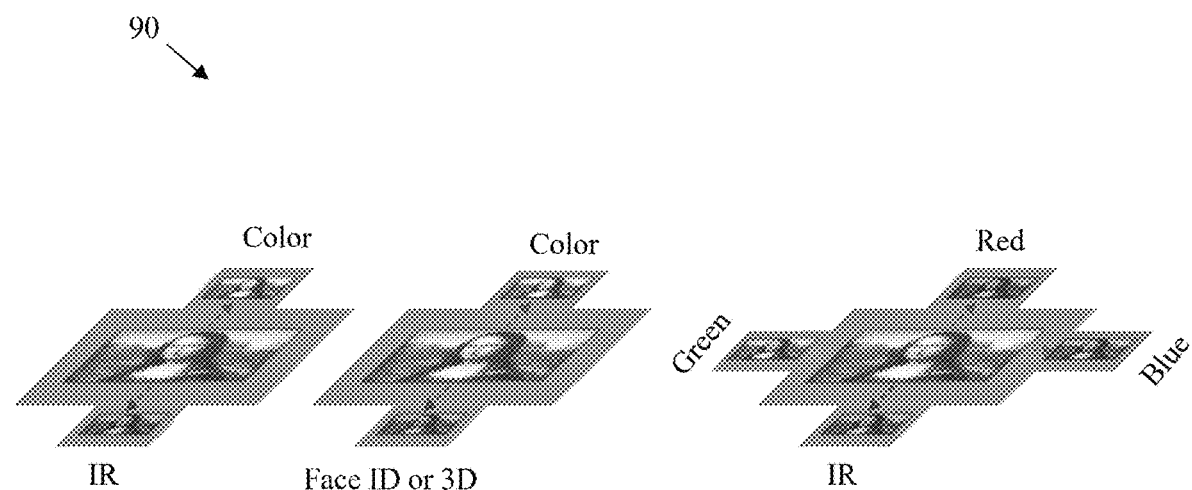
FIG. 9 shows a further exemplary usage of the disclosed technology in the context of beyond magnification.

Fundamentally, it is noted that it might be particularly advantageous if the optical system 10 is used in the context of at least one of a mobile phone application such as a smartphone application, an imager application, a display application, an X-ray application such as application 80 according to FIG. 8, a beyond magnification application such as application 90 according to FIG. 9, an endoscopy application, for example a medical endoscopy application, a time-of-flight system especially for at least one of a mobile application, an augmented reality application, an automotive and/or machine vision application, or any combination thereof.

With respect to the above-mentioned imager application, it is noted that such an imager application may exemplarily include an imager with a fixed magnification for a small CIS especially at low cost but large magnification, an imager with a zoom lens in a mobile phone especially at an ultimate small form factor, or an imager for lens-free imaging especially with large pixels.

Furthermore, with respect to the above-mentioned display application, such a display application may exemplarily include an eye tracking sensor especially for an augmented reality and/or virtual reality application, for example an augmented reality and/or virtual reality glass application. Moreover, with respect to the above-mentioned endoscopy application, for example the medical endoscopy application, it is noted that a small camera system can advantageously be integrated in disposable endoscopes.

In addition to this, regarding the eye tracking sensor mentioned above and/or with respect to the above-mentioned time-of-flight system especially for at least one of a mobile application, an augmented reality application, an automotive and/or machine vision application, it is noted that the intensity of a respective infrared source can advantageously be limited especially in order to fulfill eye safety requirements.

Figure 2A:
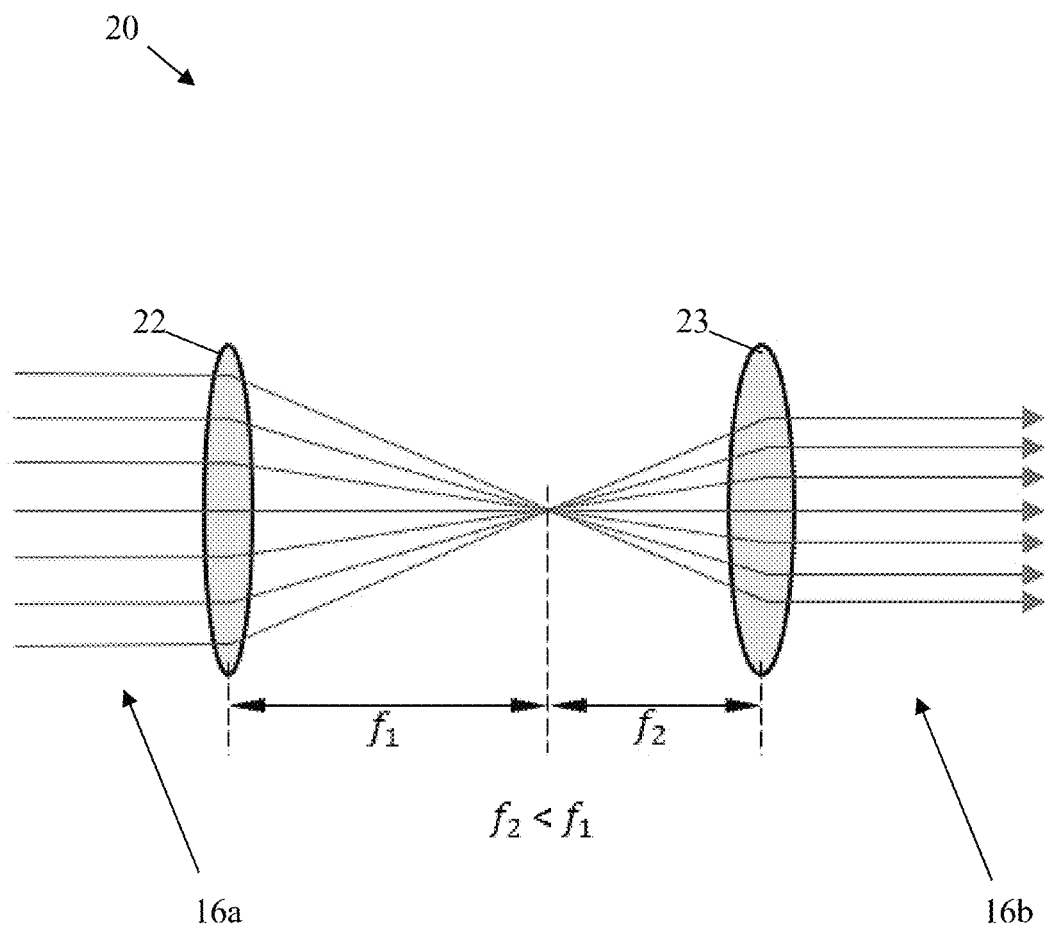
FIG. 2A shows an exemplary optical system in the sense of a free-space optics setup for further explanation of the disclosed technology.
Figure 2B:
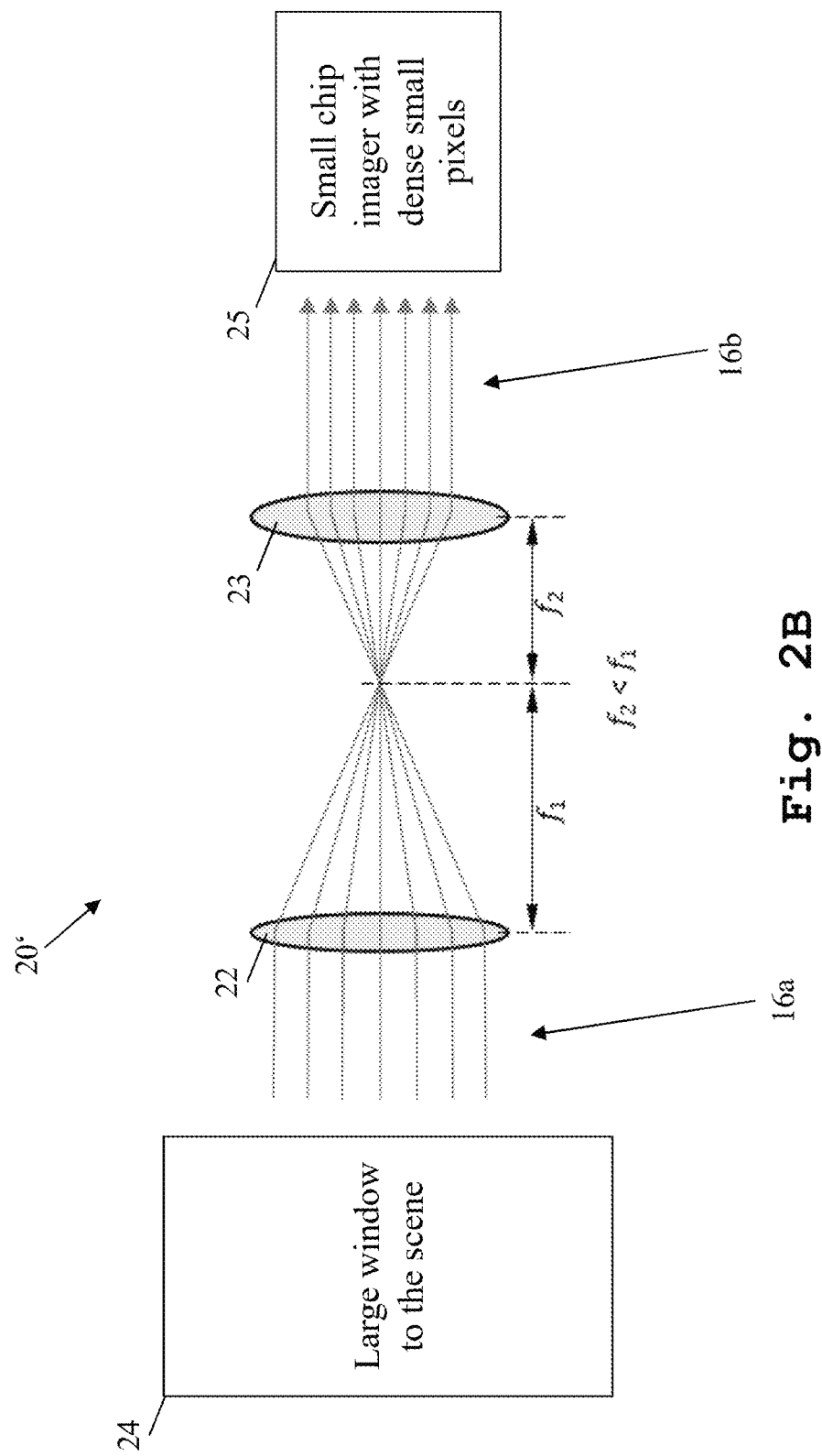
FIG. 2B illustrates an exemplary use case of the exemplary optical system of FIG. 2A.

Now, on the basis of FIG. 2A and FIG. 2B showing an exemplary confocal system 20 in the sense of a free-space optics setup, the disclosed technology is further explained in the following.

As it can be seen from FIG. 2A, the confocal system, which specifically is a confocal magnification or demagnification, respectively, lens system, includes a first lens 22 having a first focal length $f_1$, and a second lens 23 having a second focal length $f_2$. The lenses 22 and 23 are arranged in free-space in a confocal manner, wherein the second focal length is smaller than the first focal length ($f_2<f_1$). In other words, the two confocal lenses 22, 23 with different focal lengths as depicted in FIG. 2A form the exemplary (de) magnification system 20 especially for a free-space optics setup.

In this context, FIG. 2B illustrates an exemplary use case 20' of the system according to FIG. 2A. As it can be seen, a large window 24 to the respective scene is converted or demagnified, respectively, to a small chip imager 25 especially with dense small pixels.

Figure 3:
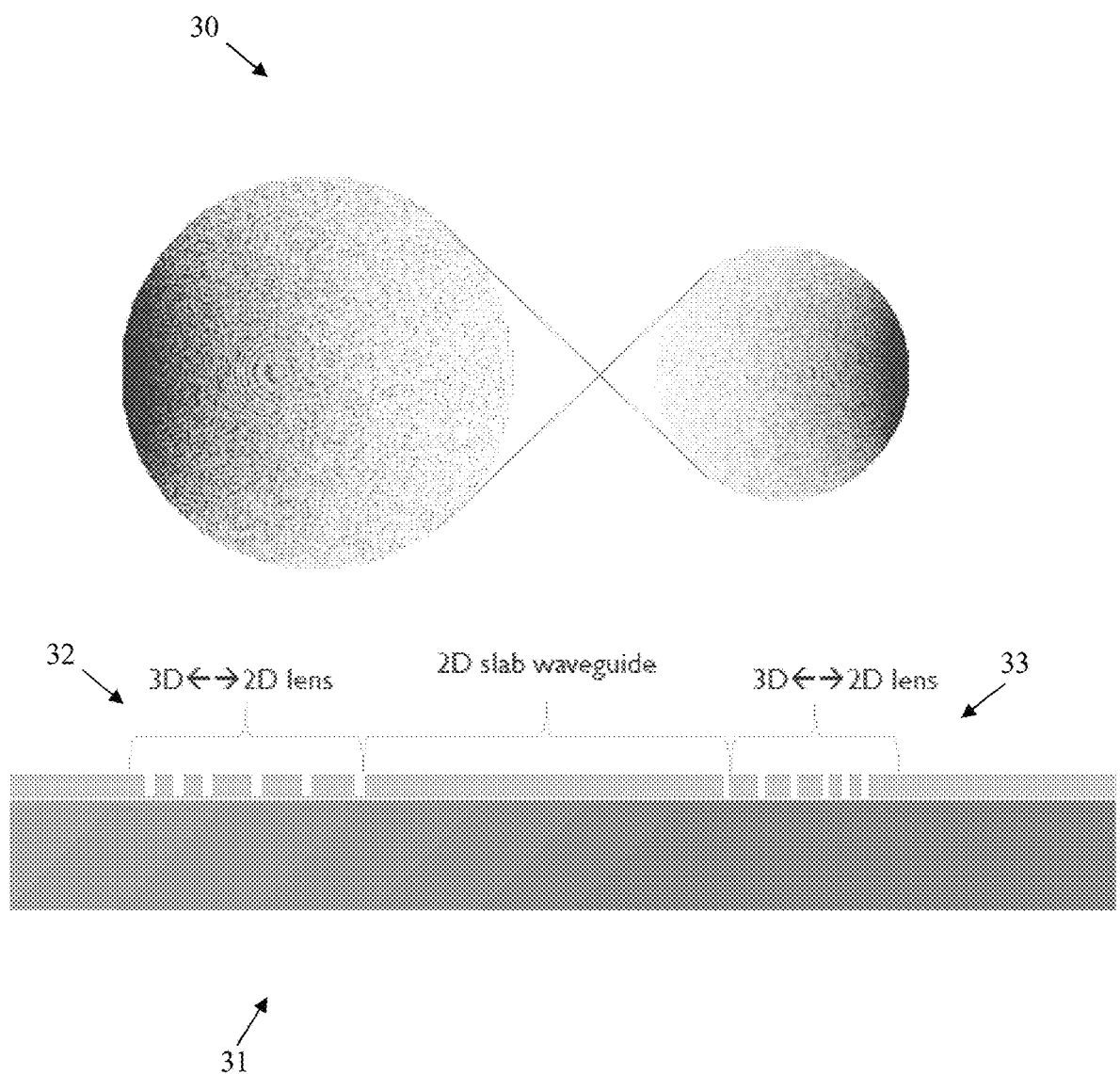
FIG. 3 shows an exemplary integrated confocal magnification system in the sense of the disclosed technology.

Furthermore, with respect to FIG. 3, a further exemplary embodiment 30 of the optical system according to the disclosed technology is illustrated. The exemplary embodiment 30 especially is an integrated optical magnification or demagnification, respectively, system. In this context, it is noted that the system 10 according to FIG. 1 may also be an integrated optical (or confocal) system, especially an integrated optical (de)magnification system.

In this exemplary case according to FIG. 3, coupling structures 32, 33 such as focusing grating couplers or complex diffractive components, are used to convert three-dimensional (3D) free-space propagation to a two-dimensional (2D) free-space propagation in a slab-waveguide 31 especially with only z-direction confinement.

It might be particularly advantageous if the first coupling structure 32 is configured to couple light into the waveguide 31, whereas the second coupling structure 33 is configured to couple light out of the waveguide 31. In this context, the first coupling structure 32 may be configured to convert 3D to 2D propagation, whereas the second coupling structure 33 may be configured to convert 2D to 3D propagation. It is noted that the above-mentioned coupling structures 32 and 33 especially are examples for the first and second coupling means 12 and 13 according to FIG. 1, whereas the slab-waveguide 31 is an example of the optical waveguide 11 of FIG. 1.

Figure 4:
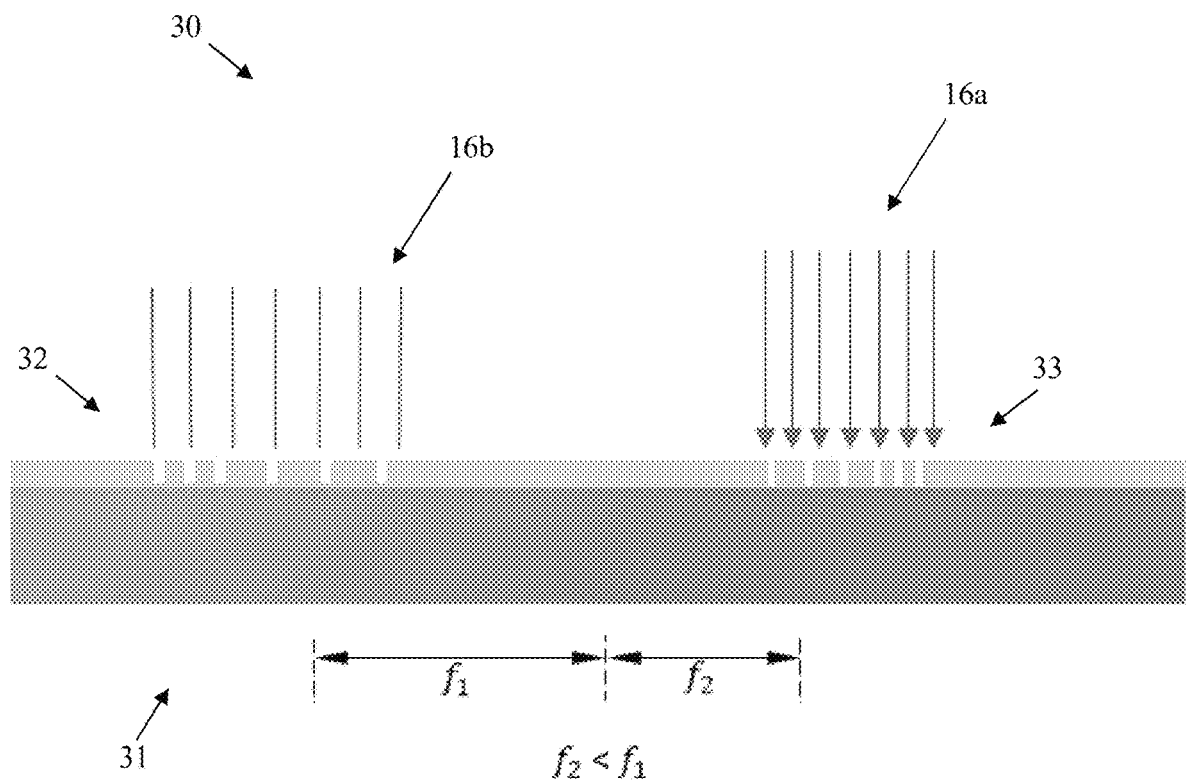
FIG. 4 illustrates magnification in accordance with the disclosed technology.
Figure 5:
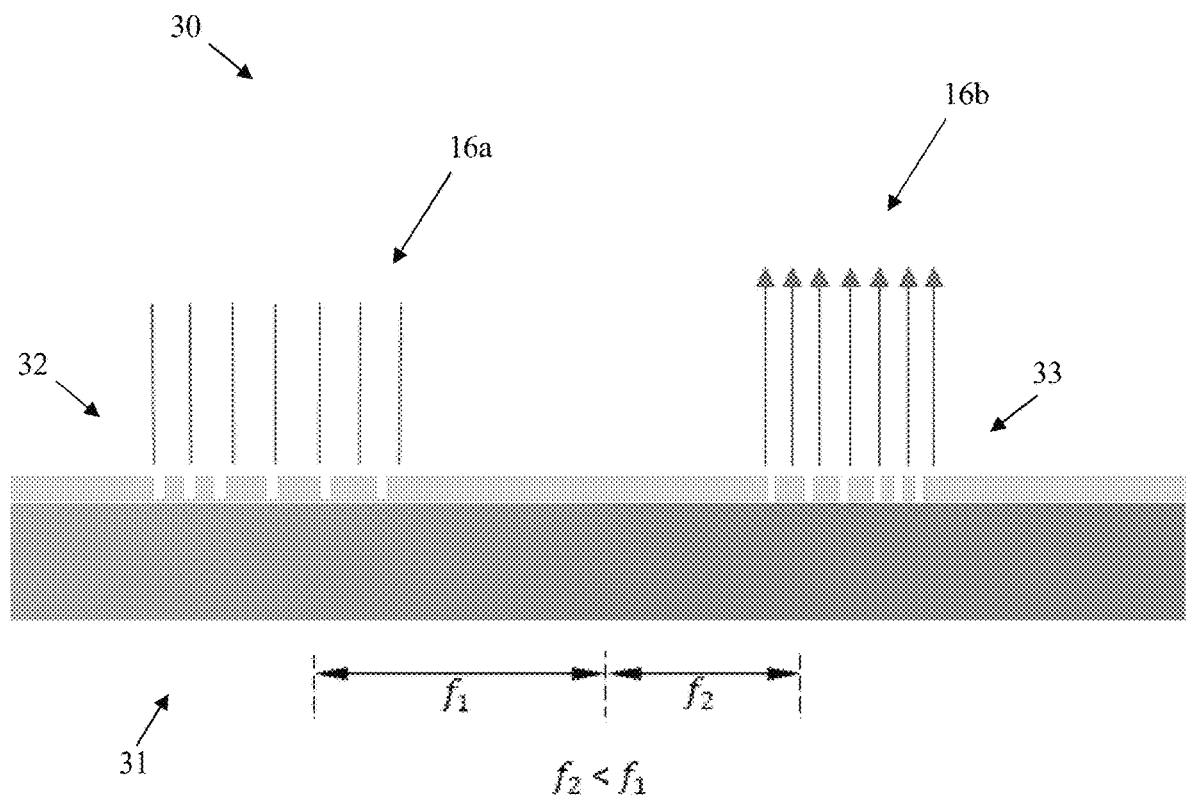
FIG. 5 illustrates demagnification according to the disclosed technology.
Figure 6:
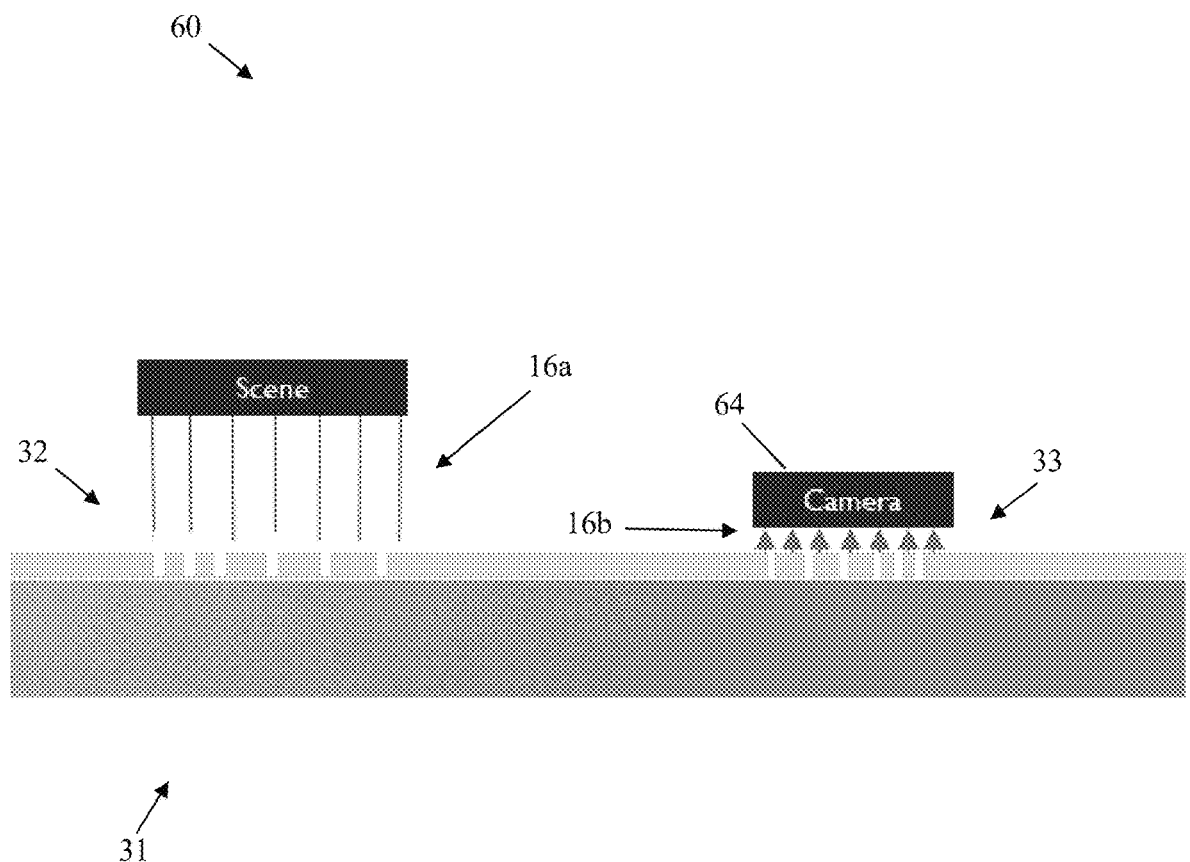
FIG. 6 shows an exemplary integrated CMOS image sensor (CIS) on flat magnification optics in the sense of the disclosed technology.

Moreover, FIG. 4 and FIG. 5 sketch the usage of the above-mentioned system 30 according to FIG. 3 for magnification (FIG. 4) and demagnification (FIG. 5), especially demonstrating the reciprocity of such passive confocal systems, whereas FIG. 6 being especially based on the system 30 of FIG. 3 exemplarily depicts an implementation 60 especially for increasing the effective area of a small CIS.

In the context of FIG. 6, it is noted that the coupling structure converting 3D to 2D propagation might have to be modified especially in order to handle the proximity, and eventually bear-field mounting, of the CIS or the CIS chip, respectively.

It is further noted that each component of such optical systems in the sense of the disclosed technology can be made variable by, for example, introducing liquid crystal, electro-optic materials such as barium titanate (BTO), thermal tuning, geometrical variations such as micro-electromechanical systems (MEMS), etc. Tuning, for instance, the optical path distance between the respective coupling structures such as the coupling structures 32 and 33, tunes the corresponding effective magnification factor.

This tuning of the magnification factor may be implemented in camera objectives by mechanically moving lenses or lens groups, but in accordance with the disclosed technology, this can efficiently be done especially by vertically biasing the horizontal optical path. In this context, it is noted that only modifying one optical path may result in optical aberrations which should eventually be compensated by modifying various optical lengths and/or by tuning the focus strengths of the respective coupling structures.

Again, with respect to FIG. 6, it is noted that for the implementation case of increasing the effective area of the CIS, pixel with super high full well capacity might be essential, while especially keeping the noise level low, for example to cope with increased illumination level. It is further noted that the foregoing explanations, especially regarding image sensor systems, can analogously be applied to projection systems and to alternative applications, wherein fixed or tunable magnifications are required.

Figure 7:
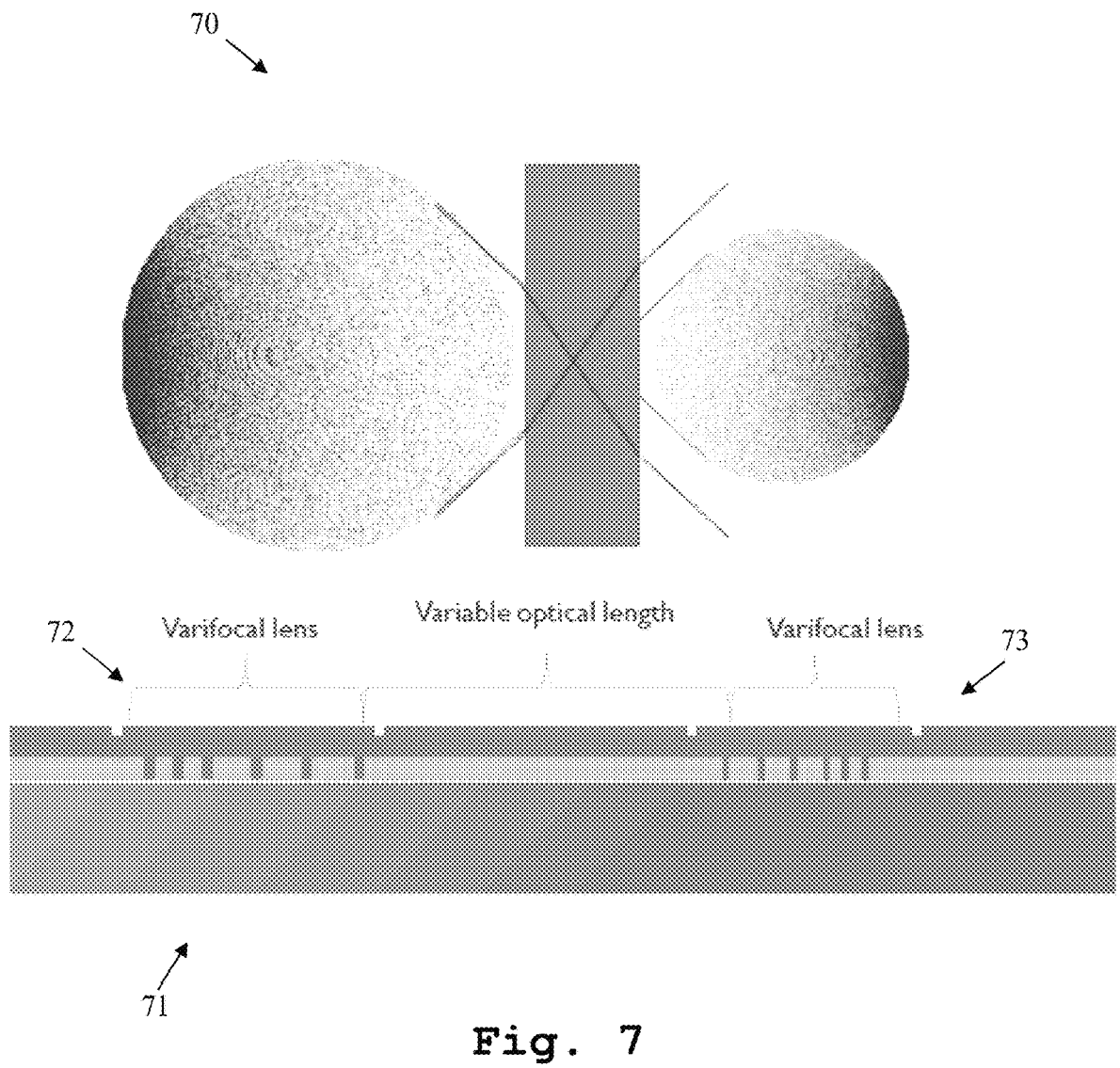
FIG. 7 illustrates tunable magnification obtained through optical propagation path tuning in accordance with the disclosed technology.

With respect to FIG. 7, the tunable (de)magnification according to embodiments of the disclosed technology having already been described above, which is especially obtained through optical propagation path tuning, is illustrated. As it can be seen from FIG. 7, the first coupling means of the system is implemented in the form of a first varifocal lens 72 being especially embodied as a structure of the optical waveguide 71. Furthermore, the second coupling means is implemented in the form of a second varifocal lens 73 being especially embodied as a structure of the optical waveguide 71. Moreover, the respective optical length between the lenses 72 and 73 is variable, in some embodiments.

Now, with respect to FIG. 8, an exemplary usage, especially in the form of a system 80, of the disclosed technology in the context of an X-ray image sensor is depicted. The system 80 includes a scintillator 87, an optical waveguide 81 (with coupling means) such as the waveguides 11, 31, 71 above, an optical sensor such as the optical sensor 14, exemplarily a CIS or a CIS chip 88, respectively, and a shielded box 89.

It is particularly advantageous that the optical sensor can be fully protected with a shielding structure, exemplarily with the aid of the shielded box 89, which makes the design of the optical sensor or the CIS chip 88, respectively, significantly easier.

Further advantageously, the respective X-ray dose can be reduced while the corresponding signal-to-noise ratio is at least maintained or even increased, whereby low costs are ensured. In this context, the optical waveguide 81 may connect the scintillator 87 of the system 80 to the optical sensor or the CIS chip 88, respectively.

FIG. 9 shows a further exemplary usage of the disclosed technology in the context of beyond magnification, which may be employed for ultra compact form factor image handling such as a color direction from one RGB scene to three (or more) wavelength-dedicated imagers, or a multi-function system with 3D sent to an ID NIR imager and 2D high res sent to 2D imager, or a Fourier domain imaging in an equivalent 4F system.

Figure 10:
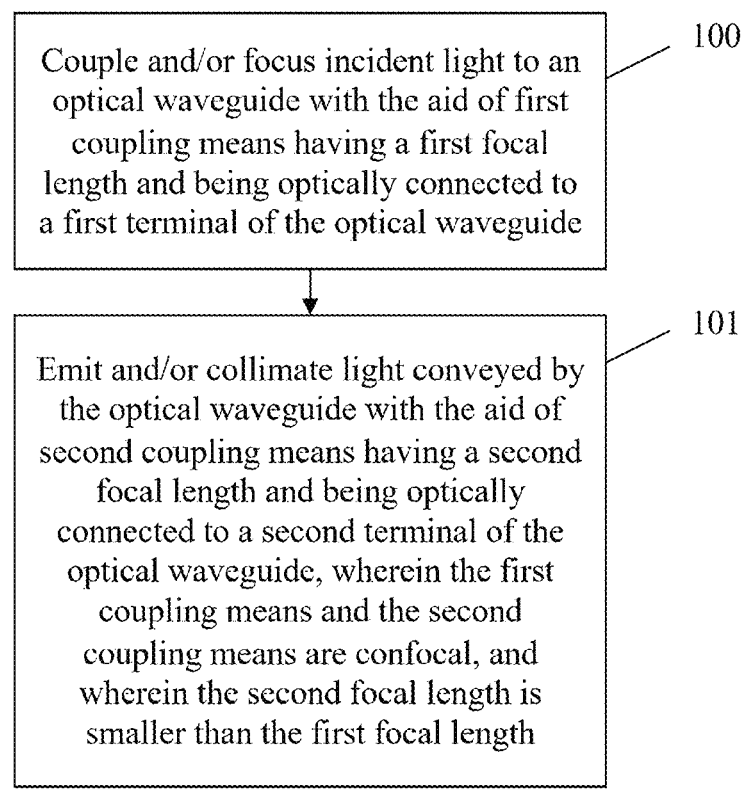
FIG. 10 shows a flow chart of an exemplary embodiment of the optical method according to the disclosed technology.

Finally, FIG. 10 shows a flow chart of an embodiment of the optical method according to the disclosed technology. In a first step 100, incident light is coupled and/or focused to an optical waveguide with the aid of first coupling means having a first focal length and being optically connected to a first terminal of the optical waveguide. Then, in a second step 101, light conveyed by the optical waveguide is emitted and/or collimated with the aid of second coupling means having a second focal length and being optically connected to a second terminal of the optical waveguide. In this context, the first coupling means and the second coupling means are confocal, wherein the second focal length is smaller than the first focal length. It is noted that such an optical method can also be called confocal method.

It might be particularly advantageous if the method further includes the step of receiving the light emitted and/or collimated by the second coupling means with the aid of an optical sensor. In this context, the optical sensor may especially include or be a camera or an image sensor, for example a complementary metal-oxide-semiconductor image sensor.

With respect to the first coupling means, it is noted that the first coupling means may especially include at least one of a lens, a grating structure, for example a focusing grating coupler, a diffractive element, for example a complex diffractive component, or any combination thereof.

Additionally or alternatively, the second coupling means may especially include at least one of a lens, a grating structure, for example a focusing grating coupler, a diffractive element, for example a complex diffractive component, or any combination thereof.

With respect to the optical waveguide, it is noted that it might be particularly advantageous if the optical waveguide includes or is a slab-waveguide.

It is further noted that it might be also particularly advantageous if at least one, or in some embodiments each, of the optical waveguide, the first coupling means, and the second coupling means includes at least one of liquid crystal, an electro-optic material, for example barium titanate, geometrical variations, for example formed by way of a micro-electro-mechanical system, or any combination thereof.

Moreover, the optical method or the confocal method, respectively, may further include the step of configuring at least one, or in some embodiments each, of the optical waveguide, the first coupling means, and the second coupling means to be thermally and/or electrically tunable.

In this context, it is noted that each of the above-mentioned liquid crystal, the electro-optic material, for example barium titanate, the geometrical variations, for example formed by way of the micro-electro-mechanical system, may exemplarily allow for this tunability.

In addition to this or as an alternative, the method may include the step of adjusting or tuning at least one optical parameter of the optical waveguide and/or the first coupling means and/or the second coupling means, for example of the optical waveguide especially at least in the region between the first coupling means and the second coupling means, with the aid of adjusting means.

With respect to the above-mentioned at least one optical parameter, it might be particularly advantageous if the at least one optical parameter includes or is a refractive index. Moreover, with respect to the optical waveguide, the method may additionally or alternatively include the step of tuning an optical path distance between the first coupling means and the second coupling means especially in order to tune an effective magnification factor of the confocal system with the aid of the adjusting means.

In further addition to this or as a further alternative, with respect to the optical waveguide, the optical method may include the step of biasing an optical path between the first coupling means and the second coupling means in a biasing direction with the aid of the adjusting means.

In this context, it might be particularly advantageous if the optical path and the biasing direction enclose an angle between 75 and 105 degrees, or between 80 and 100 degrees, or between 85 and 95 degrees, or in one example 90 degrees.

Furthermore, for biasing the optical path between the first coupling means and the second coupling means, the optical method may additionally or alternatively include the step of generating an electrical field substantially parallel to the biasing direction with the aid of the adjusting means.

With respect to the adjusting means, it is noted that it might be particularly advantageous if the adjusting means includes or is a modulator and/or a capacitance.

Fundamentally, it is noted that it might be particularly advantageous if the optical method is used in the context of at least one of an imager application, a display application, an X-ray application such as the above-mentioned application 80 according to FIG. 8, a beyond magnification application such as the application 90 described above according to FIG. 9, or any combination thereof.

With respect to the above-mentioned imager application, it is noted that such an imager application may exemplarily include an imager with a fixed magnification for a small CIS especially at low cost but large magnification, an imager with a zoom lens in a mobile phone especially at an ultimate small form factor, or an imager for lens-free imaging especially with large pixels.

Furthermore, with respect to the above-mentioned display application, such a display application may exemplarily include an eye tracking sensor especially for an augmented reality and/or virtual reality application, for example an augmented reality and/or virtual reality glass application.

While various embodiments of the disclosed technology have been described above, it should be understood that they have been presented by way of example only, and not limitation. Numerous changes to the disclosed embodiments can be made in accordance with the disclosure herein without departing from the spirit or scope of the disclosed technology. Thus, the breadth and scope of the disclosed technology should not be limited by any of the above-described embodiments.

Although the disclosed technology has been illustrated and described with respect to one or more implementations, equivalent alterations and modifications will occur to others skilled in the art upon the reading and understanding of this specification and the drawings. In addition, while a particular feature of the disclosed technology may have been disclosed with respect to only one of several implementations, such feature may be combined with one or more other features of the other implementations as may be desired and advantageous for any given or particular application.

What is claimed is:

1. An optical system comprising:
an optical waveguide;
at least a first coupling means having a first focal length;
at least a second coupling means having a second focal length; and
an optical sensor being configured to receive light emitted and/or collimated by the second coupling means,
wherein the first coupling means is configured to couple and/or focus incident light to the optical waveguide,
wherein the second coupling means is configured to emit and/or collimate light conveyed by the optical waveguide,
wherein the at least two coupling means are both focusing on at least one confocal point being located within the optical waveguide,
wherein the first coupling means and the second coupling means are confocal, and
wherein the second focal length is smaller than the first focal length.

2. The optical system according to claim 1, wherein the optical sensor comprises a camera or an image sensor.

3. The optical system according to claim 1, wherein the optical sensor comprises a complementary metal-oxide-semiconductor image sensor.

4. The optical system according to claim 1,
wherein the first coupling means comprises at least one of a lens, a grating structure, a diffractive element, or any combination thereof, and
wherein the second coupling means comprises at least one of a lens, a grating structure, a diffractive element, or any combination thereof.

5. The optical system according to claim 4, wherein at least one of the lenses is a Fresnel lens, and/or wherein at least one of the grating structures is a focusing grating coupler, and/or wherein at least one of the diffractive elements is a complex diffractive component.

6. The optical system according to claim 1, wherein at least one of the optical waveguide, the first coupling means, and the second coupling means comprises at least one of a liquid crystal, an electro-optic material, geometrical variations, or any combination thereof.

7. The optical system according to claim 6, wherein at least one of the electro-optic materials is barium titanate, and/or wherein at least some of the geometrical variations are formed by way of a micro-electro-mechanical system.

8. The optical system according to claim 1, wherein at least one of the optical waveguide, the first coupling means, and the second coupling means is configured to be thermally and/or electrically tunable.

9. The optical system according to claim 1, wherein the optical system further comprises an adjusting means, wherein the adjusting means is configured to adjust or tune at least one optical parameter of the optical waveguide, the first coupling means, or the second coupling means to adjust or tune at least one optical parameter of the optical waveguide at least in the region between the first coupling means and the second coupling means.

10. The optical system according to claim 9, wherein the at least one optical parameter comprises a refractive index.

11. The optical system according to claim 9, wherein with respect to the optical waveguide, the adjusting means is configured to tune an optical path distance between the first coupling means and the second coupling means in order to tune an effective magnification factor of the optical system.

12. The optical system according to claim 9, wherein with respect to the optical waveguide, the adjusting means is configured to bias an optical path between the first coupling means and the second coupling means in a biasing direction.

13. The optical system according to claim 12, wherein the optical path and the biasing direction enclose an angle between 75 and 105 degrees.

14. The optical system according to claim 12, wherein for biasing the optical path between the first coupling means and the second coupling means, the adjusting means is configured to generate an electrical field substantially parallel to the biasing direction.

15. The optical system according to claim 9, wherein the adjusting means comprises a modulator and/or a capacitance.

16. A system comprising the optical system according to claim 1, wherein the system is an imager application, a display application, an X-ray application, a beyond magnification application, an endoscopy application, a medical endoscopy application, or any combination thereof.

17. The optical system according to claim 1, wherein the optical waveguide comprises a slab-waveguide.

18. The optical system according to claim 1, wherein the optical system further comprises at least one further coupling means of the at least two coupling means, the at least one further coupling means comprising at least one of a lens, a grating structure, a diffractive element, or any combination thereof.

19. The optical system according to claim 1, wherein the optical system further comprises at least one further coupling means of the at least two coupling means, the at least one further coupling means comprising at least one of a liquid crystal, an electro-optic material, geometrical variations, or any combination thereof.

20. The optical system according to claim 1, wherein the optical system further comprises at least one further coupling means of the at least two coupling means, the at least one further coupling means configured to be thermally and/or electrically tunable.

21. The optical system according to claim 1, wherein the optical system further comprises at least one further coupling means of the at least two coupling means and an adjusting means, wherein the adjusting means is configured to adjust or tune the at least one further coupling means to adjust or tune at least one optical parameter of the optical waveguide at least in the region between the first coupling means and the second coupling means.

* * * * *